No. 662,670. Patented Nov. 27, 1900.
G. G. FLIGOR.
HARROW.
(Application filed June 4, 1900.)
(No Model.)
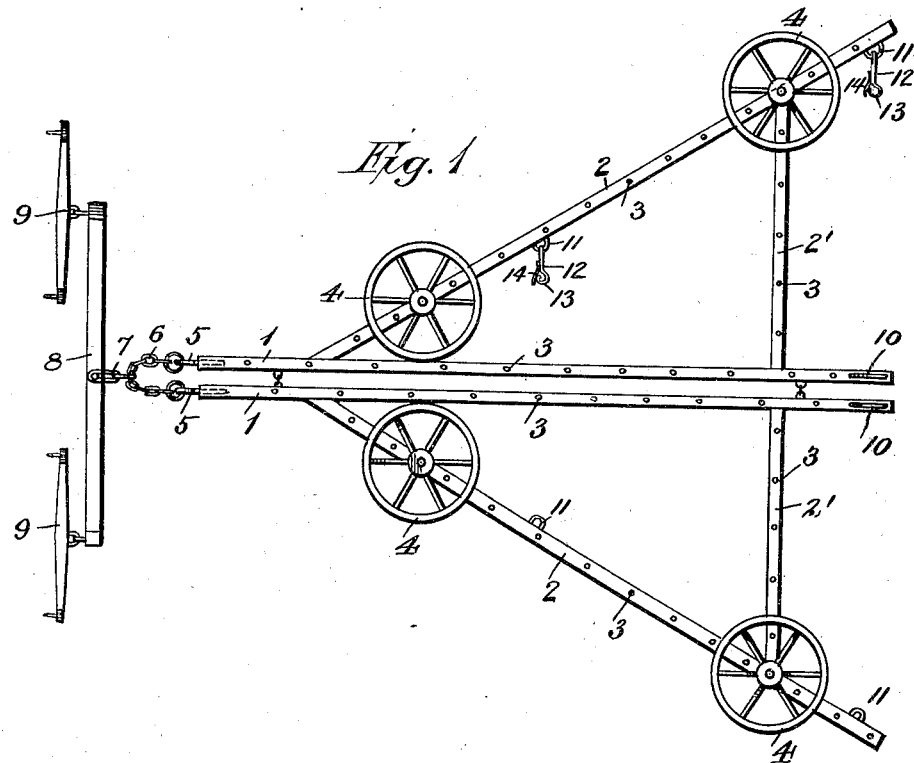
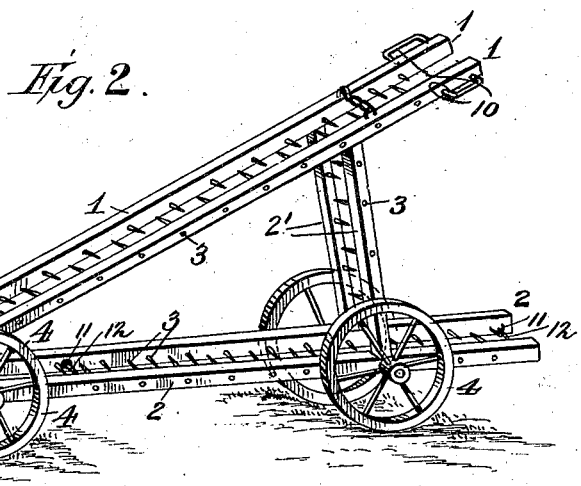
Witnesses
F. L. Ouraud,
M. V. Thompson.
Inventor
Guy G. Fligor
By John S. Duffie
Attorney

UNITED STATES PATENT OFFICE.

GUY G. FLIGOR, OF PARAGOULD, ARKANSAS, ASSIGNOR OF ONE-HALF TO EARNEST WALL, OF SAME PLACE.

HARROW.

SPECIFICATION forming part of Letters Patent No. 662,670, dated November 27, 1900.

Application filed June 4, 1900. Serial No. 19,025. (No model.)

*To all whom it may concern:*

Be it known that I, GUY G. FLIGOR, a citizen of the United States, residing at Paragould, in the county of Greene and State of Arkansas, have invented certain new and useful Improvements in Harrows, of which the following is a specification.

My invention is a harrow; and it consists of two V-shaped halves hinged together, each of the outer beams of said halves being provided with wheels which turn horizontally on the outer beams. Said harrow is adapted to be folded together in such manner that the wheels will run upon the ground, and thus the harrow is carried along.

In the accompanying drawings, Figure 1 is a top plan view of my invention open, and Fig. 2 is a perspective view of my invention closed.

1 represents the center beams, 2 represents the side beams, and 2' represents the crossbeams. These beams are provided their entire length with teeth 3. On the upper faces of the side beams 2 and near each end thereof are pivoted wheels 4. In the front ends of the beams 1 are secured eyebolts 5, and in the eye of each eyebolt works one end of a chain 6. The loop of the chain is secured in a clevis 7, and between the front ends of the clevis 7 is pivoted a doubletree 8, and to each end of the doubletree 8 are secured singletrees 9.

To the rear ends of the beams 1 are secured handholds 10. To the inner faces of the side beams are secured eyes 11, and in the eyes 11 of one of these beams are hinged hooks 12, and the openings 13 in these hooks 12 are closed by spring 14.

In operation this harrow is drawn over the ground, and if it strikes a stump or obstruction of any kind the wheels on the side where the obstruction is met with strike the obstruction and throw the harrow off from it, so that it may pass on without injury to the side beams or the teeth, and so it is that any inexperienced person may drive the harrow with safety.

When I wish to fold the harrow up, I take hold of the handholds 10 and lift up the center beams, and this brings the side beams nearly together, and then I hook the hooks 12 in the eyes 11, and the said eyes catch in the openings 13 of the said hooks, and the springs 14 hold them firmly in place, and thus the harrow is easily moved from place to place just as a wagon or a truck is moved. It will also be seen that in this shape, as shown in Fig. 2, the harrow is capable of carrying a reasonable load—tools, seed, or the like.

Having described my invention, what I claim as new, and desire to secure by Letters Patent, is—

1. A harrow consisting of two V-shaped parts hinged together, wheels journaled on the upper faces and near each end of the outer beams of said parts; said parts adapted to be folded together, and held in such position by suitable means, substantially as shown and described and for the purposes set forth.

2. A harrow, consisting of two V-shaped parts, hinged together, and having, extending from their lower faces, teeth; wheels, journaled on the upper faces and near each end of the side beams; eyes secured to the inner faces of the side beams; hooks, provided with eyes and springs to close said eyes, hinged in one set of said eyes and adapted to catch in the eyes of the opposite beam; handholds, secured to the rear ends of the center beams, means for securing to the front ends of said beams a team, substantially as shown and described and for the purposes set forth.

In testimony whereof I affix my signature in presence of two witnesses.

GUY G. FLIGOR.

Witnesses:
 A. A. KNOX,
 A. D. JACKSON.